(12) United States Patent
Chao

(10) Patent No.: US 7,978,265 B2
(45) Date of Patent: Jul. 12, 2011

(54) METHOD AND APPARATUS OF DEINTERLACING

(75) Inventor: Po-Wei Chao, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1434 days.

(21) Appl. No.: 11/279,398

(22) Filed: Apr. 12, 2006

(65) Prior Publication Data

US 2006/0227242 A1 Oct. 12, 2006

(30) Foreign Application Priority Data

Apr. 12, 2005 (TW) .............................. 94111471 A

(51) Int. Cl.
*H04N 7/00* (2011.01)
*H04N 11/20* (2006.01)

(52) U.S. Cl. ....................................................... 348/452
(58) Field of Classification Search .......... 348/441–459, 348/699–703
See application file for complete search history.

(56) References Cited

U.S. PATENT DOCUMENTS

| | | | |
|---|---|---|---|
| 4,477,843 A | 10/1984 | Kinjo et al. |
| 4,685,002 A | 8/1987 | Powers |
| 4,864,389 A | 9/1989 | Faroudja et al. |
| 4,982,280 A | 1/1991 | Lyon et al. |
| 4,989,090 A | 1/1991 | Faroudja |
| 5,134,480 A | 7/1992 | Wang |
| 5,291,280 A | 3/1994 | Faroudja et al. |
| 5,305,120 A | 4/1994 | Faroudja |
| 5,502,508 A | 3/1996 | Kawabata |
| 5,523,798 A | 6/1996 | Hagino |
| 5,625,421 A | 4/1997 | Faroudja |
| 5,671,018 A * | 9/1997 | Ohara et al. ................... 348/452 |
| 5,748,250 A | 5/1998 | Markandey et al. |
| 5,892,553 A | 4/1999 | Delmas |
| 6,133,957 A | 10/2000 | Campbell |
| 6,188,445 B1 | 2/2001 | Taketani |
| 6,333,764 B1 | 12/2001 | Robinson |
| 6,414,719 B1 | 7/2002 | Parikh |
| 6,417,887 B1 | 7/2002 | Yamaji |
| 6,421,090 B1 | 7/2002 | Jiang et al. |
| 6,459,455 B1 | 10/2002 | Jiang et al. |
| 6,545,719 B1 | 4/2003 | Topper |
| 6,686,923 B2 | 2/2004 | Ji et al. |
| 6,757,022 B2 | 6/2004 | Wredenhagen et al. |
| 6,784,942 B2 | 8/2004 | Selby |
| 6,986,081 B1 | 1/2006 | Furutani |

(Continued)

FOREIGN PATENT DOCUMENTS

TW        266377        12/1995

(Continued)

*Primary Examiner* — M. Lee
(74) *Attorney, Agent, or Firm* — Thomas, Kayden, Horstemeyer & Risley, LLP

(57) ABSTRACT

A de-interlacing method for generating a pixel value of a target position of an output frame corresponding to a target field is disclosed. The de-interlacing method includes: generating a first motion value corresponding to the target position of the target field; determining whether the target position of the target field has motion; determining if image corresponding to the target position meets a predetermined condition; generating at least a second motion value, wherein each second motion value corresponds to a reference position of the target position; and according to the first motion value, the second motion value, and the result of the motion determining step, performing either an inter-field interpolation or an intra-field interpolation to generate the pixel value of the target position of the output frame.

24 Claims, 4 Drawing Sheets

U.S. PATENT DOCUMENTS

| | | |
|---|---|---|
| 7,092,038 B2 | 8/2006 | Shih |
| 7,271,850 B2 | 9/2007 | Chao |
| 7,280,159 B2 | 10/2007 | Chao |
| 7,397,515 B2 | 7/2008 | Walls |
| 7,423,691 B2 * | 9/2008 | Orlick et al. .................. 348/448 |
| 7,440,031 B2 * | 10/2008 | Jung ............................ 348/452 |
| 7,460,180 B2 | 12/2008 | Chao |
| 7,554,610 B2 | 6/2009 | Zhu |
| 2004/0212732 A1 * | 10/2004 | Matsuzaki et al. ............ 348/452 |

FOREIGN PATENT DOCUMENTS

| | | |
|---|---|---|
| TW | 398157 | 7/2000 |
| TW | 457782 | 10/2001 |
| TW | 533741 | 5/2003 |
| TW | 589905 | 6/2004 |
| TW | 594659 | 6/2004 |

* cited by examiner

METHOD AND APPARATUS OF DEINTERLACING

BACKGROUND OF THE INVENTION

1. Field of the Invention

The invention relates to image processing techniques, and more particularly, to de-interlacing methods and related apparatuses.

2. Description of the Prior Art

Typically, video display technology is divided into two categories. The first category is called interlaced scan and the second category is called progressive scan. Traditionally the interlaced scan technology refers the process of how to display an image frame according to two fields which are respectively formed by odd and even scan lines of the image frames. The progressive scan is also known as a non-interlaced scan, which refers to the combination of two fields into one frame, and then subsequently scanning all the scan lines of the frame with double horizontal scan frequency to improve the image quality.

When displaying interlaced image data on a progressive scan type device, it is necessary to perform a de-interlacing operation. Usually de-interlacing operation involves interpolating a new scan line between two original successive scan lines. Therefore, improving the image quality of the scan line during interpolation becomes one of the most important issues in the related industry.

SUMMARY OF THE INVENTION

It is therefore one of the many objectives of the claimed invention to provide a method and apparatus of image de-interlacing for improving the image quality of de-interlacing.

An exemplary embodiment of a de-interlacing method for generating a pixel value of a target position of an output frame corresponding to a target field is disclosed. The de-interlacing method includes generating a first motion value corresponding to the target position of the target field; determining whether the target position of the target field has motion; generating at least a second motion value, wherein each second motion value corresponds to a reference position of the target position; and according to the first motion value, the second motion value, and the result of the motion determining step, performing either an inter-field interpolation or an intra-field interpolation to generate the pixel value of the target position of the output frame.

Another exemplary embodiment of a de-interlacing method for generating a pixel value of a target position of an output frame corresponding to a target field is disclosed. The de-interlacing method includes determining whether the target position of the target field has motion; determining whether image corresponding to the target position meets a predetermined condition; and if the target position is determined to have motion and the image corresponding to the target position meets the predetermined condition, performing an inter-field interpolation operation to generate the pixel value of the target position of the output frame.

Furthermore, another exemplary embodiment of a de-interlacing apparatus for generating a pixel value of a target position of an output frame corresponding to a target field is disclosed. The de-interlacing apparatus comprises a motion detector for determining whether an image corresponding to a target position of the target field has motion; an image feature detector determining whether the image corresponding to the target position meets a predetermined condition; a determining unit, coupled to the motion detector and the image feature detector, for determining a pixel interpolation regulation of the target position of the output frame according to a determining result from the motion detector and the image feature detector; and a pixel interpolation unit, coupling to the determining unit, for performing either an inter-field interpolation or an intra-field interpolation to generate the pixel value of the target position of the output frame according to the pixel interpolation regulation.

These and other objectives of the present invention will no doubt become obvious to those of ordinary skill in the art after reading the following detailed description of the preferred embodiment that is illustrated in the various figures and drawings.

DETAILED DESCRIPTION

The innovative de-interlacing method of the present invention is briefly stated as follows: When the image of a target position is detected and determined to have motion, namely the image of the target position is not a "still" image, if the image corresponding to the target position meets certain specific image feature condition, then according to the de-interlacing method of the present invention an inter-field interpolation is performed to generate the pixel value of the target position.

Please note that, the de-interlacing method and related apparatus disclosed below is suitable for various kinds of applications of motion adaptive de-interlacing and motion compensation de-interlacing. In addition, the term "pixel value" as used herein can be the luminance of the pixel, the chrominance of the pixel, or other values well known in or later introduced to the art that are available to process a de-interlacing operation.

Figure 1:
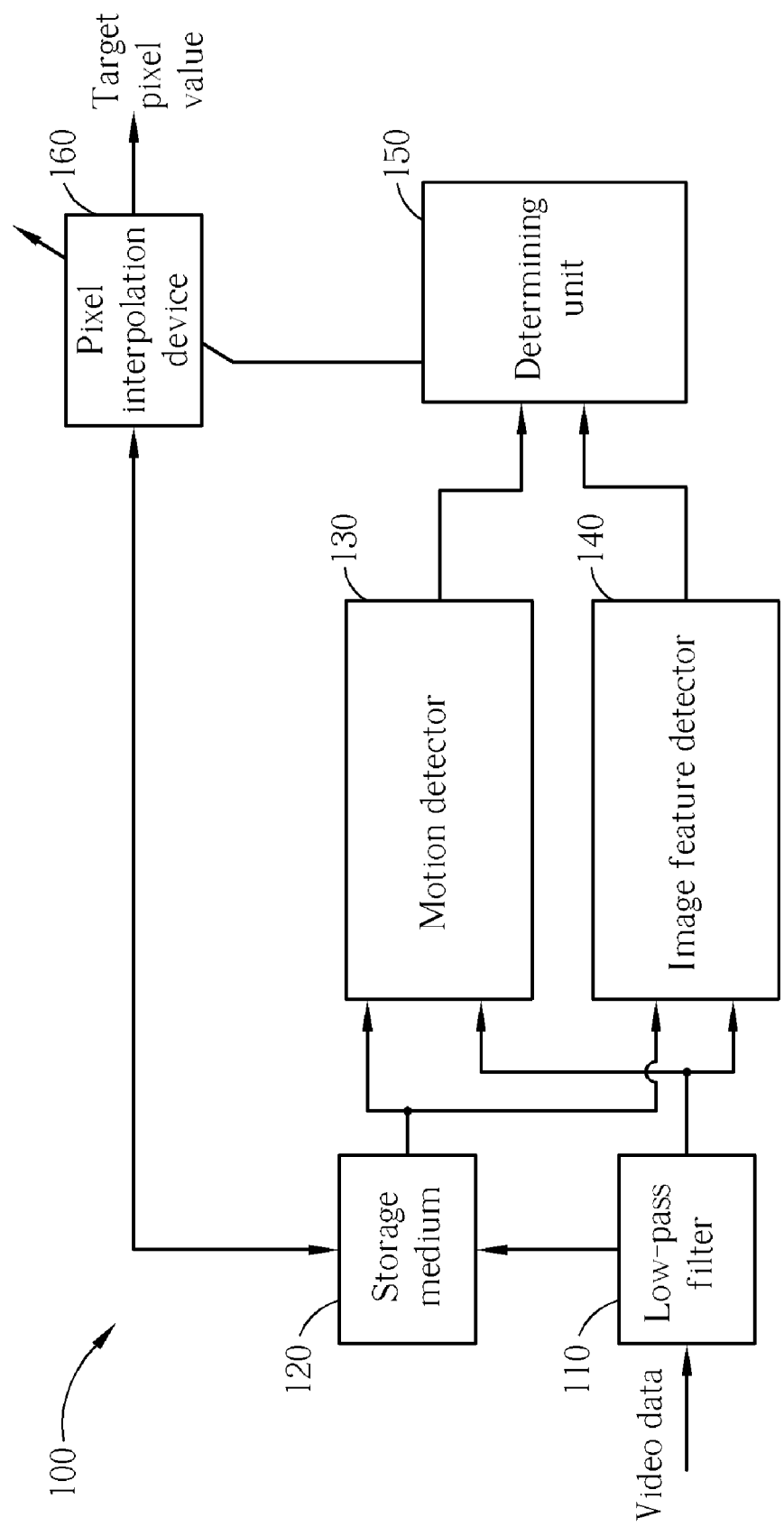
FIG. 1 is a block diagram of a de-interlacing device according to an embodiment of the present invention.

Please refer to FIG. 1. FIG. 1 is a block diagram of a de-interlacing device 100 according to an embodiment of the present invention. The de-interlacing device 100 includes a low-pass filter 110, a storage medium 120, a motion detector 130, an image feature detector 140, a determining unit 150, and a pixel interpolation device 160. The low-pass filter 110 is used to perform low-pass filtering on the video data, which are input to the de-interlacing device 100, and smoothes the image of the video data. In practice, the de-interlacing device 100 can also perform video processing of the data directly without utilizing the low-pass filter 110. The storage medium 120 is used to temporarily store the pixel data needed in the process of the de-interlacing operation, which is normally achieved by a buffer or a memory. In one embodiment, the motion detector 130 performs image motion detection on the received video data on a pixel-by-pixel basis, and the image feature detector 140 examines, also on a pixel-by-pixel basis, whether the image of the video data meet the specific image feature. Next, according to the results from the motion detector 130 and the image feature detector 140, the determining unit 150 controls the pixel interpolation device 160 to perform the corresponding pixel interpolation operation for generating an output frame.

Figure 2:
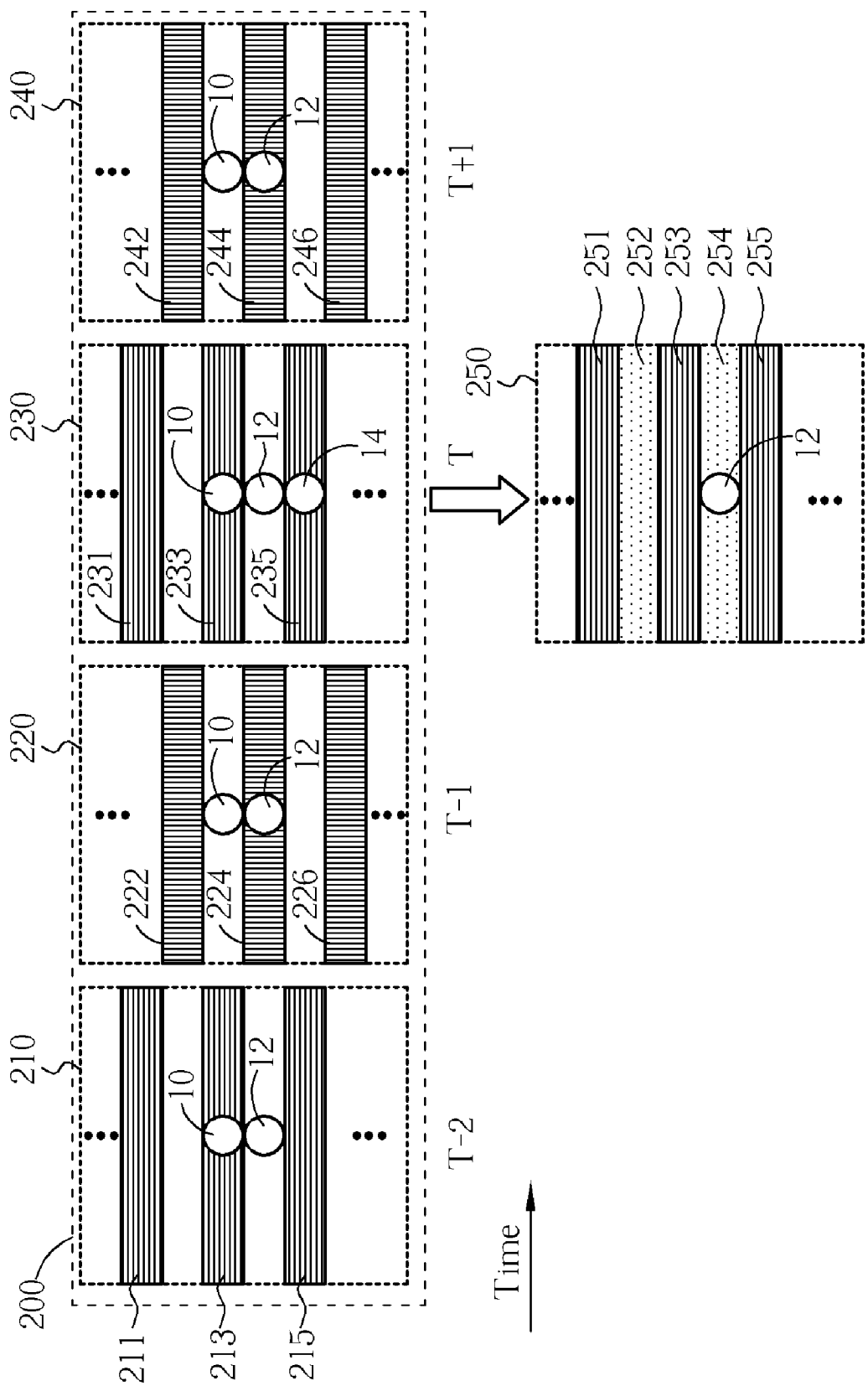
FIG. 2 is a schematic diagram of the relationship between a video data and a corresponding output frame.

FIG. 2 is a schematic diagram of the relationship between a video data 200 and a corresponding output frame 250. In FIG. 2, the output frame 250 corresponds to time T, and the four contiguous fields 210, 220, 230 and 240 of the video data 200 respectively correspond to times T−2, T−1, T, and T+1. The scan-lines 211, 222, 231, and 242 are respectively perceived as the scan-line N−1 of the field 210, 220, 230, and 240; the scan-lines 213, 224, 233, and 244 are respectively perceived as the scan-line N of the fields 210, 220, 230, and 240; and scan-lines 215, 226, 235, and 246 are respectively perceived as the scan-line N+1 of the fields 210, 220, 230, and 240. Each scan-line includes a plurality of pixels. In this embodiment, the output frame 250 is generated from the result that the de-interlacing device 100 processes the de-interlacing process on the video data 200. Generally speaking, the de-interlacing device 100 can directly adopt, without alteration or modification, the scan-lines 231, 233, and 235 of the target field 230 corresponding to time T as the scan-lines 251, 253, and 255 of the output frame 250. However, this only serves as one example for scan-line setting, and is not meant to be taken as limitation. As for the pixels of the scan-lines 252 and 254 of the output frame 250, they are then generated from the result that the de-interlacing device 100 processes the de-interlacing operation on the video data 200.

Figure 3:
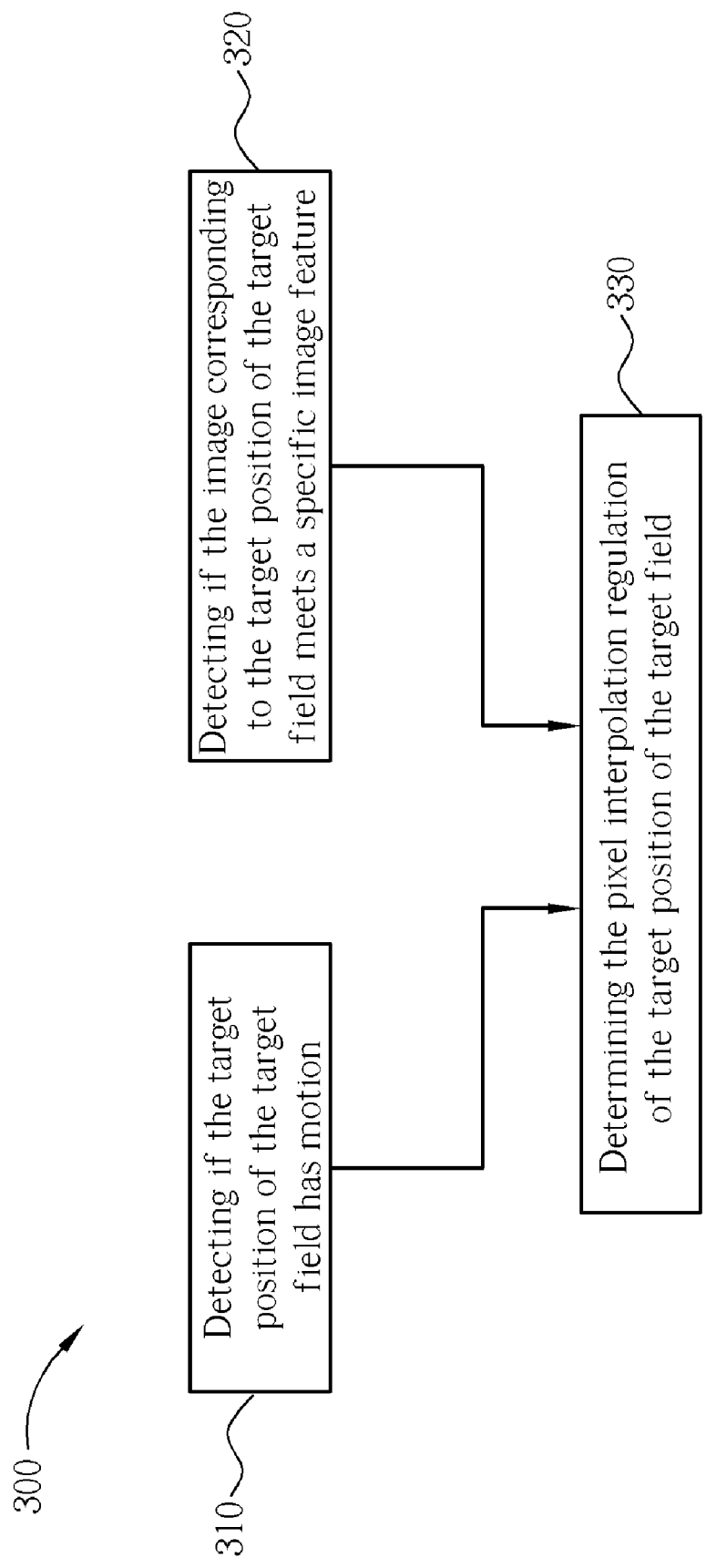
FIG. 3 shows a flowchart describing a de-interlacing method according to one embodiment of the present invention.

FIG. 3 shows a flowchart 300 describing a de-interlacing method according to one embodiment of the present invention. The flowchart 300 illustrates the operation as further described immediately in the following that the de-interlacing device 100 generates the pixel of the target position 12 of the output frame 250.

In step 310, the motion detector 130 detects and determines whether the image at the target position 12 of the target field 230 corresponding to the output frame 250 has motion. In practice, the motion detector 130 can be designed for detecting inter-frame motion or inter-field motion, or both. For instance, the motion detector 130 can detect the degree of difference between the image at or around the target position 12 corresponding to the target field 230 and the image at or around the target position 12 corresponding to the former field 220, and determine whether the image at or around the target position 12 of the target field 230 has inter-field motion, or it can detect the degree of difference between the image at or around the target position 12 corresponding to the target field 230 and the image at or around the target position 12 corresponding to the further former field 210, and determine whether the image at or around the target position 12 of the target field 230 has inter-frame motion. The motion detector 130 can also be designed to combine the two detection operations mentioned above and determine whether the target field 230 at or around the target position 12 has both inter-field motion and inter-frame motion.

As will be easily observed by a person of ordinary skill in the art, the above-mentioned degree of difference between images can be implemented using sum of absolute differences (SAD) between a plurality of pixels of a first field and a plurality of pixels of a second field, or using other known or new methods in the art. For example, in detecting the degree of difference between the images at or around the target position 12 of the fields 230 and 220, the SAD value between the pixels in the (N−1)th, Nth, and (N+1)th scan lines 231, 233, and 235 of the target field 230 (that is to say, for instance, the pixel values of and surrounding the reference position 10 of field 230) and the pixels in the (N−1)th, Nth, and (N+1)th scan lines 222, 224, and 226 of the former field 220 (that is to say, for instance, the pixel values of and surrounding the target position 12 of field 220) is first calculated. It is then determined whether there is inter-field motion at or around the target position 12 according to such a calculated SAD value. Similarly, in detecting the degree of difference between the images at or around the target position 12 of the fields 230 and 210, the SAD value between the pixels in the (N−1)th, Nth, and (N+1)th scan lines 231, 233, and 235 of the target field 230 (that is to say, for instance, the pixel values of and surrounding the reference position 10 of field 230) and the pixels in the (N−1)th, Nth, and (N+1)th scan lines 211, 213, and 215 of the former field 210 (that is to say, for instance, the pixel values of and surrounding the pixel 10 of field 210) is first calculated. It is then determined whether there is inter-frame motion at or around the target position 12 according to such a calculated SAD value.

Typically, the motion detector 130 calculates a motion value corresponding to the target position 12 of the target field 230 while performing the above-mentioned image motion detection, and then according to the motion value, the motion detector 130 determines if the image at the target position 12 of the target field 230 has motion. In practice, the motion detector 130 can embody currently existing or future technology and circuits. Furthermore, the procedures and practices are considered well known to those skilled in the art of image processing. Thus, any further detailed description is omitted herein for the sake of brevity.

In step 320, the image feature detector 140 detects and determines whether the image corresponding to the target position 12 of the target field 230 meets certain specific image feature (e.g., slow motion image or zooming image). In this embodiment, what is called slow motion image is one satisfying a motion characteristic (namely determined to be in a non-still condition) but the speed of motion is less than a threshold value. And the speed of motion can be determined by the pixel distance of the image (usually a part of an object) in two contiguous frames, or by the ratio of the motion distance of the image within a predetermined time to length or width of whole frame, or both. What is called zooming image is one that is gradually magnified or gradually reduced in size. The means of detecting slow motion image and zooming image is illustrated in detail hereinafter.

In step 330, according to the results from the motion detector 130 and the image feature detector 140, the determining unit 150 will determine the interpolation rules to be adopted by the pixel interpolation device 160 for generating the pixel value of the target position 12 of the output frame 250. Experience has it that when the image corresponding to a target position meets the condition of certain specific image feature, such as that of a slow motion image or of a zooming image, performing an inter-field interpolation operation to generate the pixel value of the target position, albeit the fact that the image has motion, can achieve better image quality than performing an intra-field interpolation operation. Therefore, in the embodiments of the present invention, when the target position 12 of the target field 230 is determined to have no motion, or the target position 12 of the target field 230 is determined to have motion but the image corresponding to the target position meets the above-mentioned specific image feature, the determining unit 150 will control the pixel interpolation device 160 to perform an inter-field interpolation operation for generating the pixel value of the target position 12 of the output frame 250 according to the pixel value corresponding to the target position 12 of the field 220 and/or field 240.

If the target position 12 of the target field 230 is determined to have motion and the image corresponding to the target position do not meet the above-mentioned specific image feature, the determining unit 150 will control the pixel interpolation device 160 according to the pixel value of the existing pixel (e.g., the pixel value of the position 10 and position 14 of the target field 230) of the target field 230 to perform an intra-field interpolation for generating the pixel value of the target position 12 of the output frame 250.

In practice, the action of comparing the first motion value and the first threshold value executed by the motion detector 130 in step 310 also can be executed by the determining unit 150 in step 330. Moreover, the above-mentioned intra-field interpolation and the inter-field interpolation can be achieved by numerous means well known or new in the art; therefore, the present invention is not limited to any specific means of the intra-field interpolation and the inter-field interpolation.

Please note that there is no particular preference as to the order of the above-mentioned step 310 and step 320 being performed. These steps can be processed one after the other or simultaneously. In practice, the detection process in step 320 can also be performed only when the target position 12 of the target field 230 is determined to have motion in step 310. Furthermore, the motion detector 130 and the image feature detector 140 shown in FIG. 1 are only functional blocks utilized for illustrating the de-interlacing operation in the embodiment of the present invention. In practice, the motion detector 130 and the image feature detector 140 can be designed and implemented in the same circuit or chip, or can be designed and implemented in separate circuits or chips.

Regarding the determination of the specific image feature, The detection of slow motion image and zooming image are taken as examples and are described as follows. With regard to the zooming image, when a video image changes responsive to a zooming operation (either zooming-in or zooming-out) during video graphing, the motion of the image generally maintains uniform speed and fixed direction throughout a particular time period. With regard to the slow motion image, it refers to the speed of motion being less then a threshold value. Certainly, the above-mentioned examples of image features are only one of the embodiments in the present invention, and are not meant to be taken as limitations. In practice, a variety of determining conditions can be designed according to different image features. In one embodiment of the present invention, the above-mentioned specific image feature is programmable.

Figure 4:
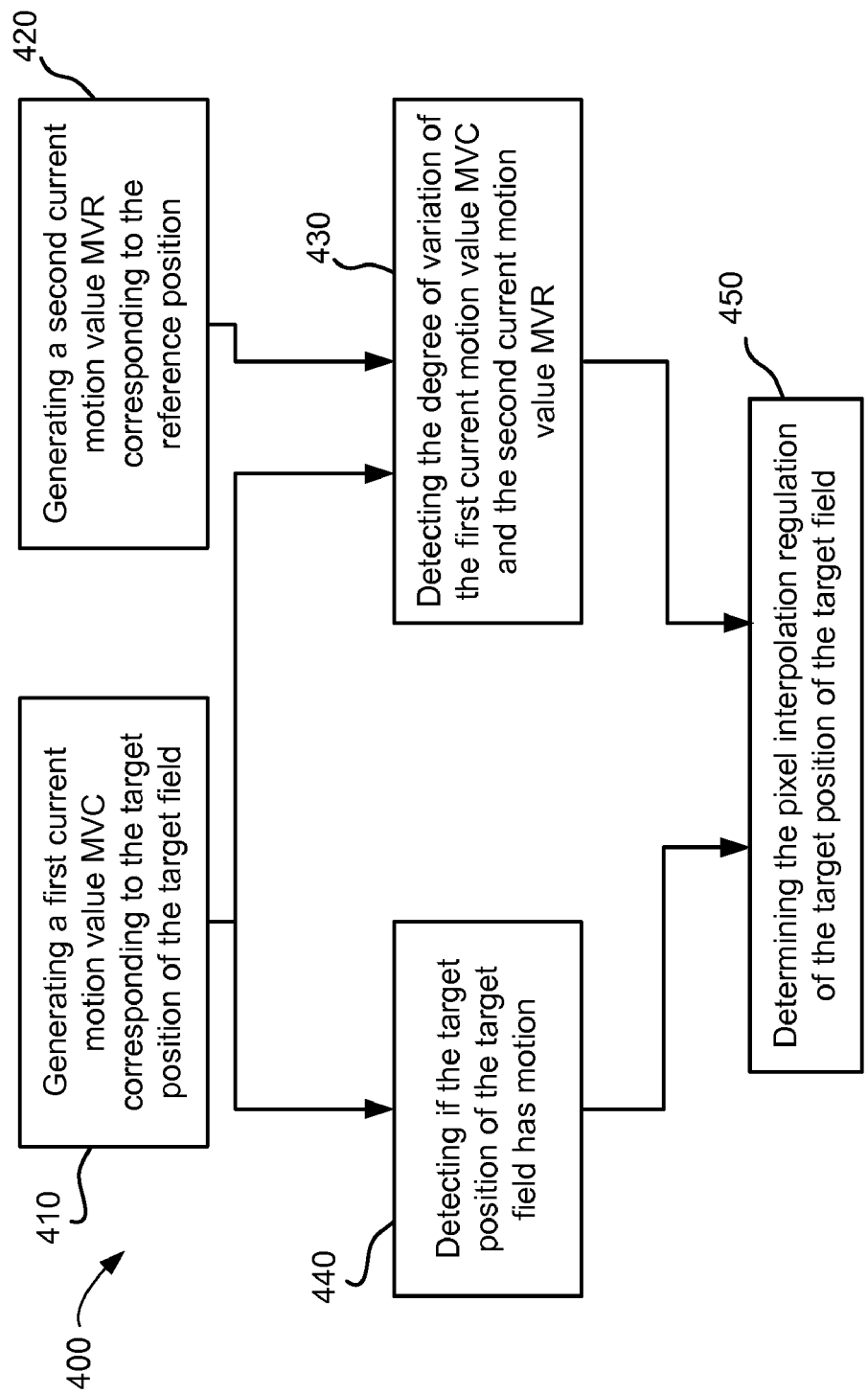
FIG. 4 shows a flowchart describing a de-interlacing method according to another embodiment of the present invention.

Please refer to FIG. 4. FIG. 4 shows a flowchart 400 describing a de-interlacing method according to another embodiment of the present invention. In this preferred embodiment, the function provided by the above-mentioned image feature detector 140 will be achieved by the cooperation of the motion detector 130 and the determining unit 150. The steps of flowchart 400 are described as below:

In step 410, the motion detector 130 will generate a first current motion value MVC which corresponds to the target position 12 of the target field 230. In this preferred embodiment, the operation of step 410 is similar to the above-mentioned step 310, and therefore detailed description is herein omitted.

In step 420, the motion detector 130 will select one pixel position around the target position 12 as a reference position, and generate a second current motion value MVR corresponding to the reference position. The reference position can be chosen at the target field 230 or the neighbor field of the target field 230 (e.g., the former field 220). For example, in this preferred embodiment, the position 10 of the target field 230 is selected as the reference position. Similarly, the motion detector 130 can generate the second current motion value MVR according to the degree of difference of the reference position 10 corresponding to the field 230 and the former field 220, the degree of difference of the reference position 10 corresponding to the field 230 and the further former field 210.

In a preferred embodiment, in order to minimize the amount of calculation in the subsequent process, the de-interlacing device 100 may utilize the storage medium 120, or a buffer, to temporarily store part of the first current motion value MVC generated from the previous detecting process of the motion detector 130. For example, if the first current motion value MVC corresponding to the selected reference position has already been stored in the buffer, then the motion detector 130 may directly read the first current motion value MVC of the reference position as the second current motion value MVR. Thus, the amount of calculation of the motion detector 130 can be reduced. Please also note that, in practice the order of step 410 and the step 420 being performed is not limited.

Next, in step 430, according to the degree of variation of the first current motion value MVC and the second current motion value MVR, the determining unit 150 will determine whether the image at or around the target position 12 of the target field 230 meets the specific image feature. In practice, the degree of variation of the first current motion value MVC and the second current motion value MVR can be examined by the change rate, the normalized change rate, variance, coefficient of variation therebetween, or other well-known parameters representing degree of variation. When the image at or around the target position 12 of the target field 230 meets the above-motioned specific image feature, such as experiencing a slow motion and a zooming motion, the degree of variation between the first current motion value MVC and the second current motion value MVR will normally lie within a predetermined range. For example, if the image at or around the target position 12 of the target field 230 is a slow motion image, then even though both the first current motion value MVC and the second current motion value MVR exceed a threshold value, below which indicates a still image, the difference between the first current motion value MVC and the second current motion value MVR still remains within certain range; that is to say, the degree of variation between the first current motion value MVC and the second current motion value MVR lies within the predetermined range. However, if the image at or around the target position 12 of the target field 230 is a fast motion image, namely the speed of motion of the image is higher than a predetermined value, the degree of variation between the first current motion value MVC and the second current motion value MVR will normally be higher than an upper limit of the predetermined range. In this embodiment, the determining unit 150 determines whether the image at or around the target position 12 meets the above-mentioned specific image feature according to the image content or the image feature (e.g., whether the displacement, the speed, or the acceleration of motion is similar) of the target position 12 and the nearby reference position 10.

In step 440, the motion detector 130 will detect whether the target position 12 of the target field 230 has motion. The motion detector 130 can compare the first current motion value MVC generated from the step 410 with a first threshold value and determine if the target position 12 of the target field 230 has motion. In addition, the motion detector 130 also can detect the motion by other motion detection methods.

In practice, the determining unit 150 can also detect whether the target position 12 of the target field 230 has motion according to the degree of variation between the first current motion value MVC and the second current motion value MVR. For example, if the degree of variation between the first current motion value MVC and the second current motion value MVR is less than a lower limit of the predetermined range, the target position 12 of the target field 230 is determined to have no motion, or be still.

In step 450, according to the results from step 430 and step 440, the determining unit 150 will determine the pixel interpolation rules to be adopted corresponding to the target position 12 of the output frame 250. In specific, in this embodiment, as long as the target position 12 of the target field 230 is determined to have no motion by the motion detector 130 in step 440, the determining unit 150 will control the pixel interpolation device 160 to perform a inter-field interpolation operation for generating the pixel value of the target position 12 of the output frame 250.

If the result in step 440 is shown that the target position 12 of the target field 230 is determined to have motion, but the result in step 430 is shown that the degree of variation between the first current motion value MVC and the second current motion value MVR lies within a predetermined range, the determining unit 150 will determine that the image corresponding to the target position 12 of the target field 230 meets the above-mentioned specific image feature, and therefore, the determining unit 150 will control the pixel interpolation device 160 to perform a inter-field interpolation operation for generating the pixel value of the target position 12 of the output frame 250. In other words, as long as the result in step 430 is shown that the degree of variation between the first current motion value MVC and the second current motion value MVR is less than the upper limit of the predetermined range, the determining unit 150 will certainly control the pixel interpolation device 160 to perform an inter-field interpolation operation for generating the pixel value of the target position 12 of the output frame 250.

Another situation is when the result in step 440 shows that the target position 12 of the target field 230 is determined to have motion, and the result in step 430 shows that the degree of variation between the first current motion value MVC and the second current motion value MVR is higher than a predetermined range, the determining unit 150 will determine that the image corresponding to the target position 12 does not meet the above-mentioned specific image feature. Therefore, by utilizing the pixel value of the existing pixel of the target field 230, the determining unit 150 will control the pixel interpolation device 160 to perform an intra-field interpolation operation for generating the pixel value of the target position 12 of the output frame 250.

Please note that, the present invention does not limit as to the number of the reference position selected in step 420 and the distance from each reference positions to the target position 12.

When the target position 12 of the target field 230 has motion, but the image meets the above-mentioned specific image feature (e.g., the motion is slow motion or zooming motion), an image edge will be generated and the image edge usually moves toward or pass through the target position 12 of the target field 230. The motion speed of the edge is normally less than a predetermined value. In practice, according to the first current motion value MVC and the second current motion value MVR generated from the above-mentioned step 410 and step 420, the determining unit 150 can determine if an edge with motion speed less then a predetermined value is passing through the target position 12 of the target field 230. If an edge with motion speed less than a predetermined value is passing through the target position 12 of the target field 230, the degree of variation between the first current motion value MVC and the second current motion value MVR will be normally less then the upper limit of the predetermined range.

As will be easily observed by a personal of ordinary skill in the art, the methods mentioned in the present invention are only examples to determine if image corresponding to the position waiting for pixel interpolation meets a specific image feature, and are not meant to be taken as limitations. As mentioned above, if the position waiting for pixel interpolation has motion, the de-interlacing method of the present invention is related to determine the pixel interpolation regulation of the position which wait for pixel interpolation according to if image corresponding to if the position which wait for pixel interpolation meets a specific image feature.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A de-interlacing method for generating a pixel value of a target position of an output frame corresponding to a target field, the de-interlacing method comprising:
   generating a first motion value corresponding to the target position of the target field;
   determining whether the target position of the target field has motion;
   generating at least a second motion value, wherein each second motion value corresponds to a reference position of the target position; and
   according to the first motion value, the second motion value, and a result of the motion determining step, performing either an inter-field interpolation or an intra-field interpolation to generate the pixel value of the target position of the output frame.

2. The method of claim 1, wherein the target position and each reference position respectively comprises at least one pixel.

3. The method of claim 1, wherein the step of generating the first motion value further comprises: determining a degree of variation of a target field corresponding to the output frame and a preceding field with respect to the target position to generate the first motion value.

4. The method of claim 1, wherein the step of generating the first motion value further comprises:
   determining a degree of variation of the output frame and a preceding frame with respect to the target position to generate the first motion value.

5. The method of claim 1, wherein the step of determining if the target position of the target field has motion further comprising:
   determining whether the target position of the target field has motion according to a comparing result of the first motion value and a threshold value.

6. The method of claim 1, further comprising:
   calculating a degree of variation of the first motion value and the second motion value; and
   if the degree of variation is less than a first threshold value, performing the inter-field interpolation to generate the pixel value of the target position of the output frame.

7. The method of claim 6, wherein when the target position is corresponding to a slow motion image, the degree of variation is between the first threshold value and a second threshold value which is less than the first threshold value.

8. The method of claim 6, wherein when the target position is corresponding to a zooming image, the degree of variation is between the first threshold value and a second threshold value which is less than the first threshold value.

9. The method of claim 1, wherein the step of generating the second motion value further comprises:

determining a degree of variation of two fields with respect to a reference position to generate a corresponding second motion value.

10. The method of claim 1, wherein the step of generating the second motion value further comprises:
determining a degree of variation of two frames with respect to a reference position to generate a corresponding second motion value.

11. The method of claim 1, further comprising:
calculating a degree of variation of the first motion value and the second motion value; and
if the degree of variation is less than a first threshold value, performing the intra-field interpolation to generate the pixel value of the target position of the output frame.

12. A de-interlacing method for generating a pixel value of a target position of an output frame, the de-interlacing method comprising:
generating a first motion value corresponding to the target position;
determining if the target position of a target field has motion according to the first motion value;
determining whether image corresponding to the target position meets a predetermined condition;
determining a pixel interpolation rule of the target position of the output frame according to the determining result of a motion detector and an image feature detector; and
performing either an inter-field interpolation operation or an intra-field interpolation operation to generate the pixel value of the target position of the output frame according to the pixel interpolation rule.

13. The method of claim 12, wherein the performing step comprises:
if the pixel interpolation rule indicates that the target position has motion and the image corresponding to the target position meets the predetermined condition, performing an inter-field interpolation operation to generate the pixel value of the target position of the output frame; and
if the pixel interpolation rule indicates that the target position has motion, and the image corresponding to the target position does not meet the predetermined condition, performing an intra-field interpolation to generate the pixel value of the target position of the output frame.

14. The method of claim 12, wherein the predetermined condition is that an edge is approximating to the target position of the target field.

15. The method of claim 12, wherein the predetermined condition is that an edge is passing through the target position.

16. The method of claim 12, wherein the predetermined condition is that an edge, which moves slower than a predetermined value, is passing through the target position.

17. The method of claim 12, wherein the predetermined condition is that the target position is corresponding to a zooming image.

18. The method of claim 12, wherein the predetermined condition is that the target position is corresponding to a slow motion image.

19. The method of claim 12, wherein the predetermined condition is that the degree of variation of the first motion value is within a predetermined range.

20. The method of claim 12, further comprising:
generating at least a second motion value, wherein each second motion value is corresponding to a reference position and each reference position comprises at least one pixel; and
determining if image corresponding to the target position meets the predetermined condition according to the first motion value and the second motion value.

21. A de-interlacing device for generating a pixel value of a target position of an output frame corresponding to a target field, and the de-interlacing device comprising:
a motion detector for determining whether an image corresponding to a target position of the target field has motion;
an image feature detector determining whether the image corresponding to the target position meets a predetermined condition;
a determining unit, coupled to a motion detector and an image feature detector, for determining a pixel interpolation rule of the target position of the output frame based on a combination of a determining result of the motion detector and the image feature detector; and
a pixel interpolation device coupled to the determining unit, for selectively performing an inter-field interpolation operation or an intra-field interpolation operation based on an output of the determining unit to generate the pixel value of the target position of the output frame according to the pixel interpolation rule.

22. The de-interlacing device of claim 21, wherein the predetermined condition is that the target position is corresponding to a zooming image.

23. The de-interlacing device of claim 21, wherein the predetermined condition is that the target position is corresponding to a slow motion image.

24. The de-interlacing device of claim 21, wherein when the target position of the target field has motion and the image corresponding to the target position meets the predetermined condition, the pixel interpolation device performs the inter-field interpolation to generate the pixel value of the target position of the output frame.

* * * * *